Feb. 11, 1969    F. J. CALLAHAN, JR    3,426,580
METHOD OF TESTING JOINTS IN PRESSURIZED FLUID LINES
Original Filed March 23, 1961                Sheet 1 of 2
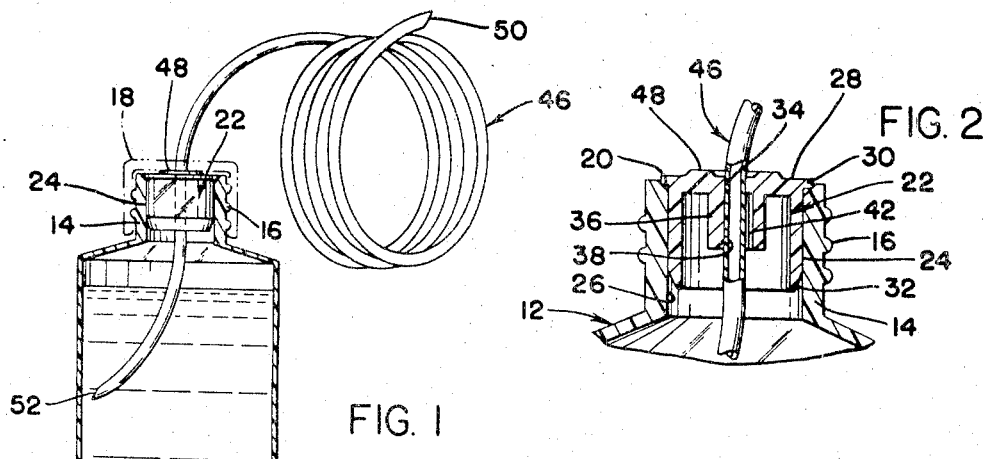
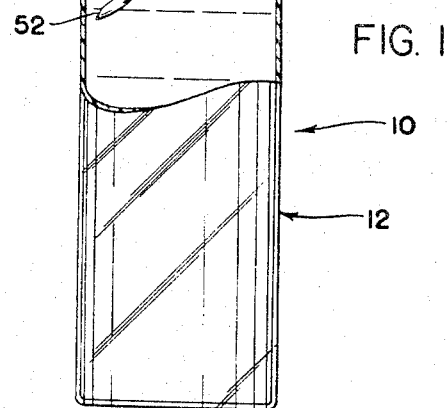
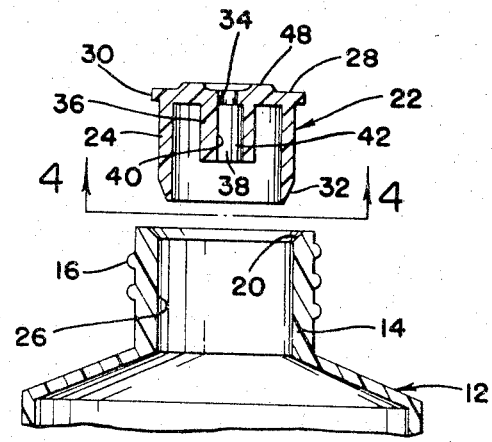
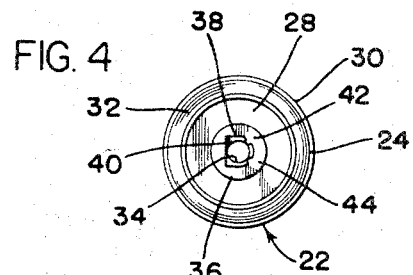
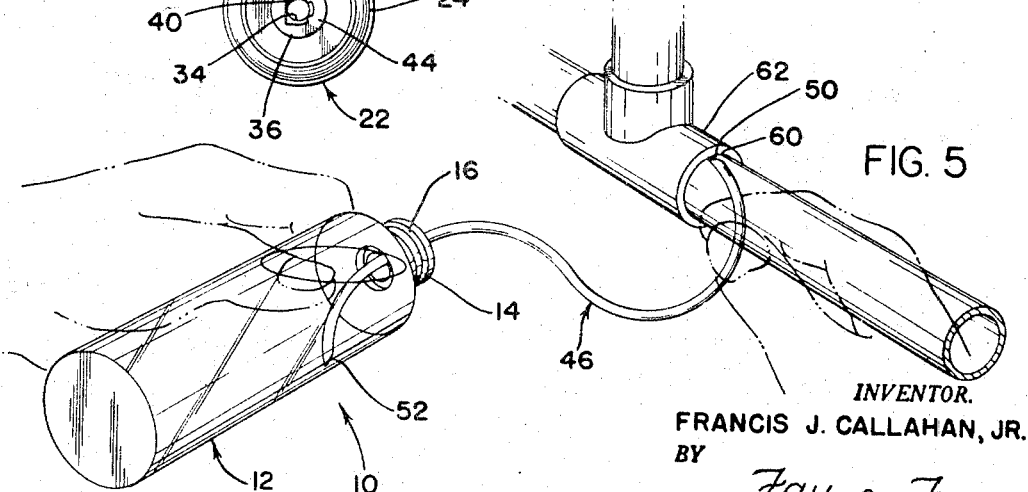
INVENTOR.
FRANCIS J. CALLAHAN, JR.
BY
Fay & Fay
ATTORNEYS United States Patent Office 3,426,580
Patented Feb. 11, 1969

3,426,580
METHOD OF TESTING JOINTS IN PRESSURIZED FLUID LINES
Francis J. Callahan, Jr., Chagrin Falls, Ohio, assignor to Nupro Company, a corporation of Ohio
Continuation of application Ser. No. 528,593, Feb. 18, 1966, which is a continuation of application Ser. No. 294,097, July 10, 1963, which in turn is a division of application Ser. No. 97,911, filed Mar. 23, 1961, now Patent No. 3,134,515. This application Jan. 25, 1967, Ser. No. 611,779
U.S. Cl. 73—40                            1 Claim
Int. Cl. G01m 3/08

ABSTRACT OF THE DISCLOSURE

A method of fluid testing joints for leaks with a manually deformable liquid-filled bottle having an extensible hose which is positioned adjacent the joint under test and the liquid dispensed in a bubble-free manner.

---

This application is a streamlined continuation of U.S. patent application Ser. No. 294,097, filed July 10, 1963 and now abandoned, which is a continuation of U.S. patent application Ser. No. 294, 097, filed July 10, 1963 and now abandoned, which is a division of U.S. patent application Ser. No. 97,911, filed Mar. 23, 1961 (now Patent No. 3,134,515).

This invention relates to a method particularly adapted for use in connection with the detection of leaks at the joints in fluid lines.

In popular use today as leak tests liquids for gas lines particularly, are a variety of liquids having suds or bubble forming qualities, such as detergents and soaps. These liquids are deposited along the parting surfaces of the joints to be tested, and if minute gas leaks exist bubbles are formed which immediately put the tester on notice that a gas-tight joint has not been provided.

Generally speaking, leak detecting or testing liquids have provided a much improved means by which to test efficiently the condition of fluid lines. The very properties such fluids which lend themselves to leak detection, however, have contributed also to the creation of problems as to handling and application.

The test liquids usually utilized are extremely fluid, having a consistency not unlike that of ordinary household liquid soaps and detergents. The testing substance, therefore, is not particular susceptible to application by pouring or scooping because of the high degree of waste incident to application methods of this type.

A recent proposal for the solution of the application problem has envisaged the use of the well-known spray bottle or container of the type employed also in connection with dispensing deodorants, colognes, and the like. While this mode of application does represent in advance relating to pouring or scooping, it also presents practical difficulties which interfere with effective testing programs.

It has been noted hereinabove that the testing liquids involved are possessed of bubble or suds forming qualities, and that it is this characteristic which makes the liquids useful as leak detectors. Spray bottles by their very nature cause the testing liquids to form bubbles when forced through the orifice of the spray bottle, because such bottles depend for their operation on the use of pressurized air for ejecting the fluids contained therein. Thus, when a spray bottle is employed for depositing the test liquid, bubbles are formed as an incident to the application process itself and the tester must wait for these bubbles to disappear before the condition of the joint being examined can be noted. This is, of course, a time consuming process and, therefore, reduces efficiency and increases testing costs. Furthermore, it tends to be somewhat unreliable on occasion in that it is not always easy for the observer to distinguish between bubbles formed by the application process and those formed as a result of minute leaks around the joint.

The spray bottle method particularly and other methods which necessitate the relative proximity of the test liquid bottle to the joint to be tested do not present a satisfactory solution to the problem for the additional reason that they are not well adapted for testing those portions of fluid lines located in reltaively inaccessible places. Obviously, under circumstances of this sort, the test liquid bottle by reason of its bulk is difficult to manipuate without interference from environmental obstacles, such as pipes, studding, valves, panel boards, and the like.

This invention has been developed to overcome the problems outlined briefly above, and contemplates in the boardest sense the use of a test liquid bottle provided with a suitable stopper having a relatively thin pliable tube slidably fitted therein. The tube may be extended from or retracted into the test liquid bottle to adapt the same for efficient use in testing varied types of installation. The use of a tube of the type described permits a test liquid to be deposited with facility around joints in fluid lines without creating bubbles as an incident to the application process itself. The use of such a tube permits a considerable degree of control to be exercised by the operator over the zones to which the test fluid is applied. Further, because the tube is elongated the necessity is eliminated for positioning the test liquid bottle extremely close to the joint to be tested during the process of applying the test liquid, and, therefore, couplings located in relatively inaccessible places may be tested with greatly increased facility.

It is a general object of the invention to provide a device for use in applying test liquid to the joints of a fluid line.

It is a further object of the invention to provide a device of the type described which is sufficiently lacking in complexity to be easily operable and commercially feasible.

Another object of the invention is to provide, in a device of the type described, means for applying test liquid to the joints to be tested without creating bubbles in the test liquid as an incident of the application process.

A still further object of the invention is ot provide leak-detecting apparatus which is readily capable of use in confined quarters and which increases the facility with which relatively inaccessible fluid line joints may be tested.

It is still another object of the invention to provide a leak detecting apparatus which includes a relatively thin, pliable, extensible and retractible tube through which test fluid may be passed to the zone to be tested.

Other and more detailed objects of the invention will be apparent from the description to follow.

In the drawings:

FIG. 1 is a side elevation partly in longitudinal section, of a leak detecting apparatus incorporating the principles of the invention;

FIG. 2 is an enlarged fragmentary view, partly in longitudinal section, showing the details of the manner in which the test liquid dispensing tube is mounted within the test liquid bottle;

FIG. 3 is an exploded view similar to FIG. 2, showing the stopper removed from the neck of the bottle;

FIG. 4 is an end view of the stopper taken along lines 4—4 of FIG. 3;

FIG. 5 is a perspective view in reduced scale showing the manner in which the leak detector apparatus of this invention may be utilized.

Figure 6:
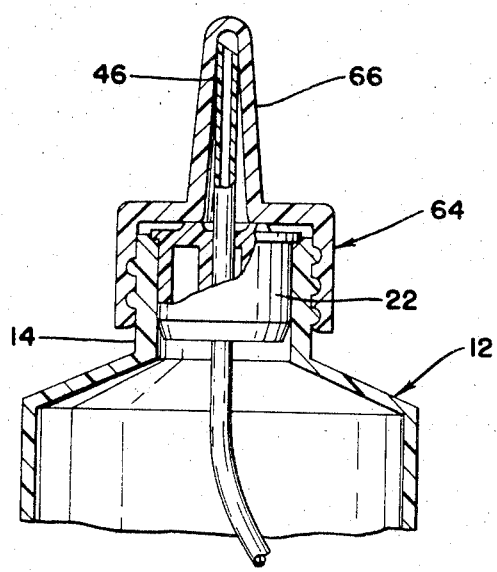
FIG. 6 is a fragmentary view, partly in section, showing the leak detector apparatus of this invention provided with a modified cap.

Referring now more particularly to the drawing, I have illustrated a leak detector apparatus indicated generally at 10. The device 10 includes a container or bottle 12 for test liquid, constructed from suitable rugged pliable material, such as polyethylene or the like. The upper end of the bottle 12 is provided with a neck 14 having external thread means or the like 16 thereon for engagement with a screw cap 18. The neck 14 at its free end is provided with a relatively shallow outwardly flared mouth 20.

Force-fitted within the neck 14 of the bottle 12 in friction sealing contact therewith is a stopper indicated generally at 22, which also may be constructed from polyethylene or the like.

The stopper 22 includes a generally cylindrical side wall 24 somewhat greater in diameter than the central opening 26 through the neck 14. The side wall 24 is closed at its outer end by a transverse end wall 28 lying in a plane substantially perpendicular to the central axis of the stopper. A portion of the transverse end wall 28 extends slightly beyond the radially outer surface of the cylindrical side wall 24 in order to provide an annular, radially extending flange 30, which seats tightly against the flared mouth 20 of the neck 14 when the stopper is in place. The engagement between the annular flange 30 and the flared mouth 20 provides for a liquid seal in addition to the sealing action between the surfaces of the cylindrical side wall 24 and the central opening 26 of the neck 14. To facilitate entry of the stopper 22 into the opening 26, the inner end of the cylindrical side wall is provided on its radially outer surface with a conical section 32.

A substantially circular aperture 34 is formed in the end wall 28, generally coaxial with the cylindrical side wall 24 of the stopper. Surrounding the aperture 34 and extending inwardly from the end wall 28 in substantially coaxial relationship with the cylindrical side wall 24 is a tubular supporting wall 36.

A bore 38 of the tubular supporting wall 36 is substantially coaxial with the aperture 34 and in cross section, as seen in FIG. 4, is generally arch-shaped. As will be observed, the bore 38 is somewhat enlarged with respect to the aperture 34 and is provided with one flat side 40 substantially tangent to the aperture 34. Opposite the flat side 40 are a pair of longitudinal ribs 42 and 44 spaced from one another around the periphery of the bore 40. As will be observed, particularly in FIG. 4, a circle drawn tangent to the flat side 40 and to the two ribs 42 and 44 in a plane perpendicular to the longitudinal axis of the stopper 22 will have substantially the same proportions as the aperture 34 and will be coaxially aligned therewith.

Frictionally received within the aperture 34 and extending through the supporting tube 36 is an elongated, relatively thin, flexible tube 46, having an external diameter slightly in excess of the diameter of the aperture 34. The flat side 40 of the bore 38 together with the ribs 42 and 44 provide support for the tube 46 over a zone of substantial length.

In a typical example, the diameter of the aperture 34 in the stopper would be about 0.11 inch and the outer diameter of the tube 46 about 0.12 inch so as to provide a compression on the tube of about 0.01 inch on the diameter of the tube. It has been found that as a practical matter this magnitude of compression is sufficient to provide suitable sealing characteristics between the stopper and the tube when the tube is carried therein.

Normally when the leak detector apparatus described herein and illustrated in FIGS. 1–5 is not in use the tube 46 will be removed from the aperture 34 and the cap 18 will tightly close the neck of the bottle 12. To improve the sealing characteristics between the screw cap 18 and the stopper 22, an annular upstanding ridge 48 is provided on the end wall 28, generally concentric with the cap 18 to prevent fluid from passing through the aperture 34 and outwardly through the threads 16.

To facilitate the case with which the tube 46 may be passed through the aperture 34 when it is desired to utilize the testing apparatus, the tube is terminated on an angle at each end as seen at 50 and 52.

Because the tube 46 is frictionally received within the aperture 34, the effective length of such tube may be adjusted easily to adapt the apparatus to the requirements of each particular testing operation. This may be accomplished by merely forcing a greater proportion of the tube into the bottle 12 or by pulling a greater proportion of the tube from it. In a practical example, the tube 46 would be about 14 inches long so that the effective length of the tube can be varied from about 0 inch to nearly 14 inches.

FIG. 5 illustrates the manner in which the apparatus may be used in applying test liquid. After passing the tube 46 through the aperture 34 and adjusting the effective length of the tube to meet the specifications of a particular testing operation, the test liquid may be applied to the parting surface 60 of the joint 62, grasping the bottle 12 in one hand and the tube 46 in the other. Tilting the bottle 12 will permit the test fluid to fill the tube, and squeezing force applied to the pliable bottle 12, once the tube has been filled with liquid, will cause flow of test fluid through the tube 46 and onto the test zone in bubble free condition. By manipulation of the tube, the operator may meter test fluid onto very precisely defined areas of the fluid line to be tested. By holding the free end of the tube 46 upwardly at any given instant, the operator may terminate the test liquid flow.

In FIG. 6, a modified cap construction has been shown for use with a dispenser embodying the principles of the invention. The modified cap, indicated at 64, is provided with a central, upstanding conical cup 66 coaxial with the bottle 12 and stopper 22. The cup diverges toward the open end of the cap, and as shown in the drawing, is adapted to receive the end of the tube 46, when the cap 64 is in place on the neck 14 of the bottle.

The use of this modified construction permits the dispenser to be shipped or stored without the necessity of removing the tube from the stopper, as is necessary with the embodiment of FIGS. 1–5. When it is desired to ship or store the modified version, the tube is merely fed into the bottle to the point where perhaps one-half to three-quarters inch of the tube projects above the stopper, and the cap 64 is put in place, with the conical cup 66 receiving snugly within it the projecting end of the tube 46, sometimes in sealed relationship with the cap.

From the description set forth hereinabove it will be seen that this invention provides an extremely simple and convenient manner by which test liquid may be applied to fluid lines, in order to determine the quality of the joints which have been made in such lines. Of particular significance is the ability of a leak detecting device embodying the principles of the invention to dispense test liquid without creating bubbles in the liquid by the application process itself.

While a single form of the invention has been illustrated for simplicity of description, it will be apparent to the skilled artisan that a number of modifications can be made to the illustrated structure without at the same time departing from the true scope of the invention.

I claim:

1. A method of testing joints in pressurized fluid lines for fluid-tightness comprising the steps of:

providing a manually deformable bottle containing a liquid having readily wettable bubble forming qualities with a stopper in the open end of the bottle and an elongated flexible hose extending through the stopper into the interior of the bottle with substantially all of the hose normally disposed in the bottle when the bottle is not in use;

grasping the exposed end of the hose and displacing the hose so that a substantial length of the hose is exterior of the bottle with the non-exposed end disposed below the liquid level of the bottle;

grasping the bottle in one hand and the exposed end of the hose in the other hand;

guiding the exposed end of the hose to a position closely adjacent the uppermost surface of the joint to be tested;

applying a steadily increasing pressure to the bottle with said one hand thereby to deform said bottle and force the liquid to be dispensed through said hose in a substantially bubble-free condition while simultaneously retaining the position of said hose with the other hand;

discontinuing the pressure on said bottle while substantially simultaneously removing the end of said hose from said joint when the liquid begins to flow around the periphery of said joint; and observing the joint for bubbles in the applied liquid.

References Cited

UNITED STATES PATENTS

| | | |
|---|---|---|
| 2,665,257 | 1/1954 | Potter. |
| 2,783,919 | 3/1957 | Ansell _____ 222—211 |
| 2,799,882 | 7/1957 | Falk _____ 73—40 |
| 2,805,001 | 9/1957 | Biederman _____ 222—211 |

LOUIS R. PRINCE, *Primary Examiner.*

DANIEL M. YASICH, *Assistant Examiner.*